US008011110B2

(12) United States Patent
Ichiryu

(10) Patent No.: US 8,011,110 B2
(45) Date of Patent: Sep. 6, 2011

(54) CENTERING MECHANISM

(75) Inventor: Taku Ichiryu, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 52 days.

(21) Appl. No.: 12/230,797

(22) Filed: Sep. 4, 2008

(65) Prior Publication Data

US 2010/0050404 A1 Mar. 4, 2010

(51) Int. Cl.
*G01D 21/00* (2006.01)
*B23Q 3/00* (2006.01)

(52) U.S. Cl. .......................................... 33/520; 33/644

(58) Field of Classification Search .................... 33/520, 33/644

See application file for complete search history.

(56) References Cited

U.S. PATENT DOCUMENTS 4,304,502 A * 12/1981 Stratienko .................... 403/370
6,854,194 B2 * 2/2005 Hansen .......................... 33/520
7,082,694 B2 * 8/2006 Lyman, Jr. ..................... 33/670
7,350,309 B2 * 4/2008 Hermann et al. ............... 33/520

FOREIGN PATENT DOCUMENTS

JP 52-018512 A 2/1977
JP 61-089902 A 5/1986
JP 10-299411 A 11/1998
JP 2005-171783 A 6/2005

OTHER PUBLICATIONS

Japanese Office Action dated Jun. 7, 2011, issued in corresponding Japanese Patent Application No. 2006-297925.

* cited by examiner

*Primary Examiner* — Christopher Fulton
(74) *Attorney, Agent, or Firm* — Westerman, Hattori, Daniels & Adrian, LLP

(57) ABSTRACT

The present invention provides a centering mechanism capable of improving the efficiency of centering work and reducing the work time and the cost. The centering mechanism centers an inner member located inside in a radial direction, with respect to an outer member arranged to surround the inner member in a circumferential direction, and includes a vertical-direction positioning unit which positions the inner member in a vertical direction in a non-stepwise manner.

5 Claims, 5 Drawing Sheets

CENTERING MECHANISM

BACKGROUND OF THE INVENTION

1. Field of the Invention

The present invention relates to a centering mechanism that performs centering of an inner casing in a turbine or a blade ring in a rotary machine such as a compressor or a turbine.

This application is based on Japanese Patent Application, Publication No. 2008-115720, the content of which is incorporated herein by reference.

2. Description of Related Art

Centering of an inner casing in a turbine or a blade ring in a rotary machine such as a compressor or a turbine is conventionally performed with the use of a pin in the horizontal direction and a key (liner) in the vertical direction (see Japanese Unexamined Patent Application, Publication No. 2005-171783 (FIGS. 2 and 3), for example).

In this case, for centering in the vertical direction, a key having a thickness larger than a planned value is made in advance, and is cut down to reduce the thickness to fit the actual inner casing or blade ring at the time of assembly and adjustment. The inner casing and the blade ring need to be adjusted such that gaps produced between moving blades and fins during operation are prevented, as much as possible, from being nonuniform in the circumferential direction, while the deformation of the casing and a bearing stand and the deflection of a rotor caused by its weight are taken into account.

However, after testing, when the deformation of the casing and the bearing stand and the deflection of the rotor caused by its weight are different from those predicted, the centering of the inner casing and the blade ring in the vertical direction and in the width direction needs to be readjusted. However, the frequency of readjusting the positions of the inner casing and the blade ring in the width direction is relatively low. Therefore, the centering in the vertical direction is mainly performed as readjustment work.

In such a case, there has been a problem in that it is necessary to make a key having a new size and to change to it, thereby taking a long time for the centering of the inner casing and the blade ring, and increasing the cost.

BRIEF SUMMARY OF THE INVENTION

The present invention has been made in view of the above-described circumstances, and an object of the present invention is to provide a centering mechanism capable of improving the efficiency of centering work and reducing the time and cost involved with such work.

The present invention employs the following solutions in order to solve the above-described problems.

According to a first aspect, the present invention provides a centering mechanism that centers an inner member located inside in a radial direction, with respect to an outer member arranged to surround the inner member in a circumferential direction, the centering mechanism including a vertical-direction positioning unit which positions the inner member in a vertical direction in a non-stepwise manner.

According to the centering mechanism described above, the inner member is centered in the vertical direction in a non-stepwise manner. Specifically, during the centering work (for example, at the time of assembly and adjustment), the inner member is moved in the vertical direction in a non-stepwise manner and is positioned at a desired position by the vertical-direction positioning unit.

Therefore, it is possible to easily and quickly position the inner member in the vertical direction, to improve the efficiency of the centering work, and to reduce the work time.

Unlike the conventional technology, it is unnecessary to prepare a new key (liner) every time the centering work is performed. Therefore, the cost and the work time required for the centering work can be substantially reduced.

The centering mechanism may further include an oblique member on which the inner member is placed and which extends obliquely with respect to a horizontal direction, in which the oblique member is moved in the horizontal direction to perform the positioning in the vertical direction.

According to the centering mechanism described above, when the oblique member is moved in the horizontal direction, the inner member placed on the oblique member (more specifically, on the upper face of the oblique member) is thus moved in the vertical direction, thereby positioning the inner member in the vertical direction.

In the above-described structure, it is more preferred that an angle formed by a horizontal plane and the upper face of the oblique member, on which the inner member is placed, be equal to or larger than a friction angle of the inner member.

According to the centering mechanism described above, since the inner member is prevented from being moved in the axial direction, the inner member can be maintained at the desired position where the inner member is always centered.

In the above-described structure, it is more preferred that a low-pressure-side end face of the inner member and a high-pressure-side end face of the outer member be structured to be always in contact.

According to the centering mechanism described above, for example, in a state where the rotary machine is stopped, or even in a state where gas pressure is low immediately after starting of operation, the low-pressure-side end face of the inner member and the high-pressure-side end face of the outer member are always maintained in contact; in other words, the interface between the low-pressure-side end face of the inner member and the high-pressure-side end face of the outer member is always maintained sealed.

According to a second aspect, the present invention provides a rotary machine including the centering mechanism capable of easily and quickly positioning the inner member in the vertical direction. Therefore, it is possible to improve the efficiency of work such as new installation and maintenance inspection of a rotary machine and to reduce the work time.

According to the present invention, it is possible to improve the efficiency of the centering work and to reduce the work time and the cost.

DETAILED DESCRIPTION OF THE INVENTION

Hereinafter, a centering mechanism according to an embodiment of the present invention will be described with reference to FIGS. 1 to 5.

Figure 1:
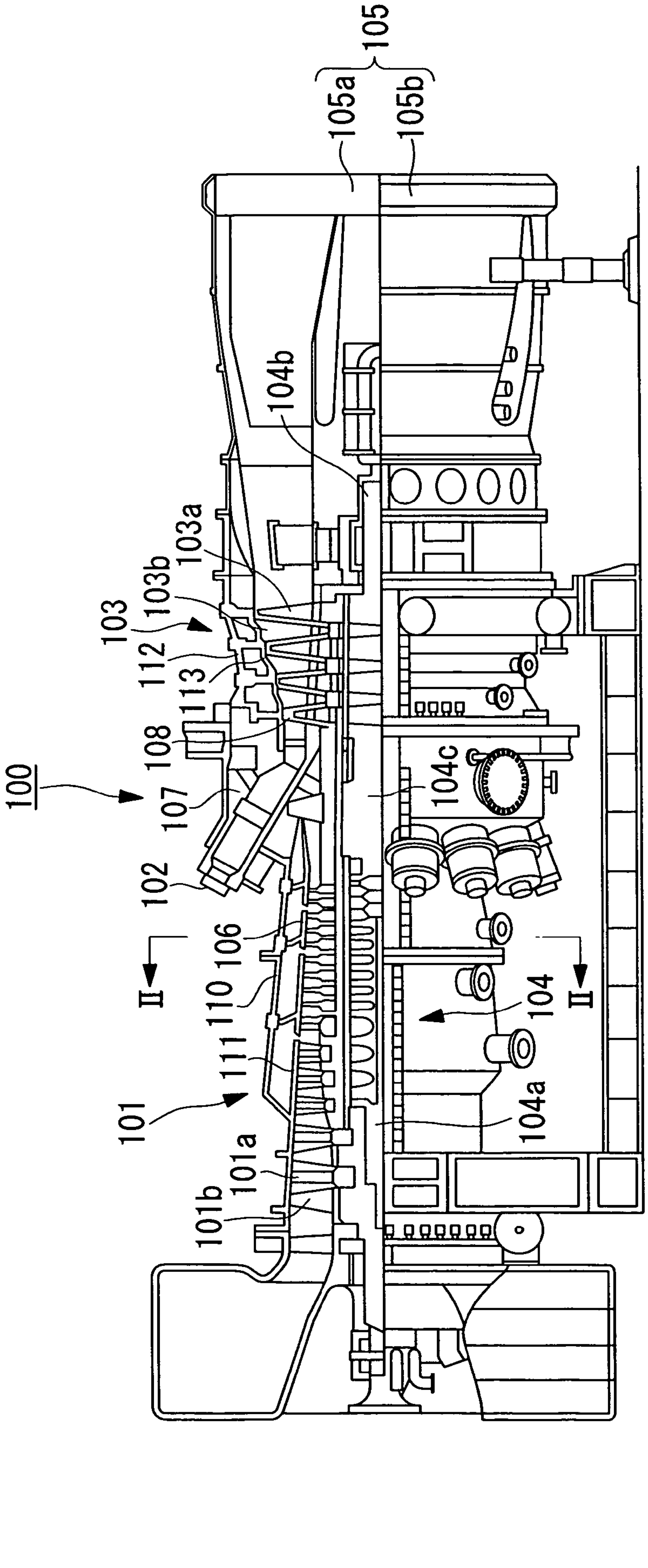
FIG. 1 is a schematic structural view of the main parts of a gas turbine having a centering mechanism according to an embodiment of the present invention.
Figure 2:
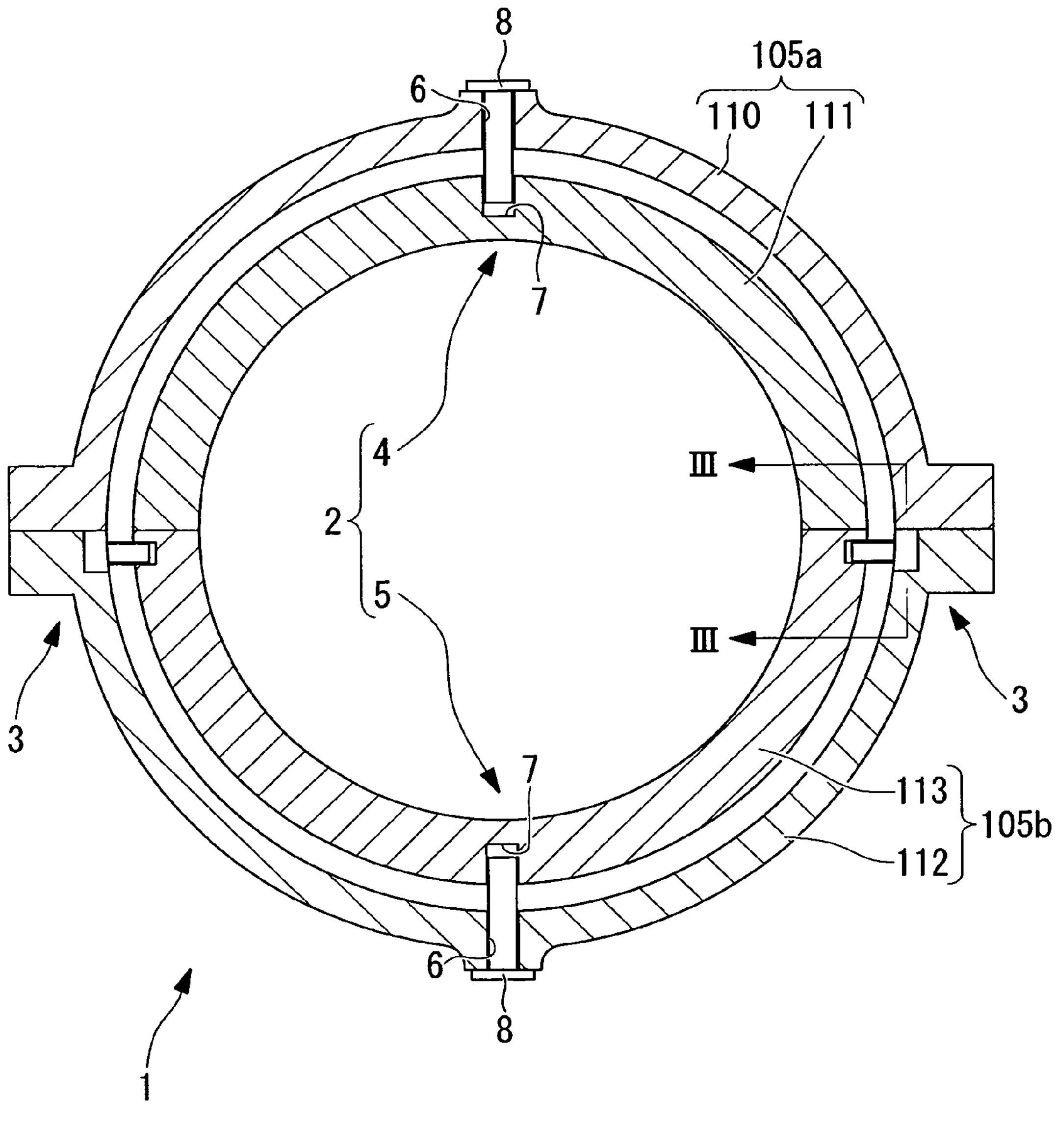
FIG. 2 is a cross-sectional view along the line II-II shown in FIG. 1.
Figure 3:
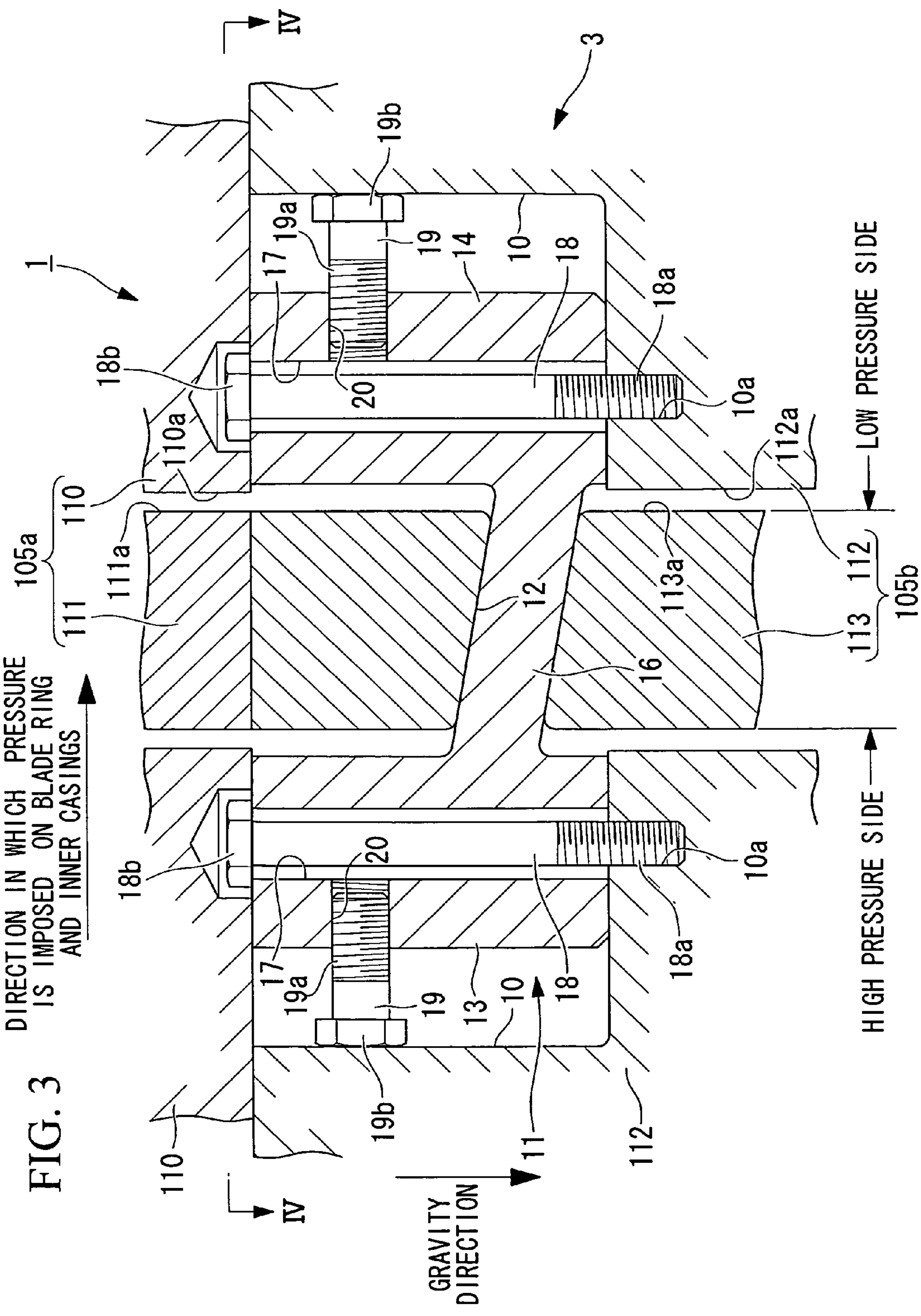
FIG. 3 is a cross-sectional view along the line III-III shown in FIG. 2.
Figure 4:
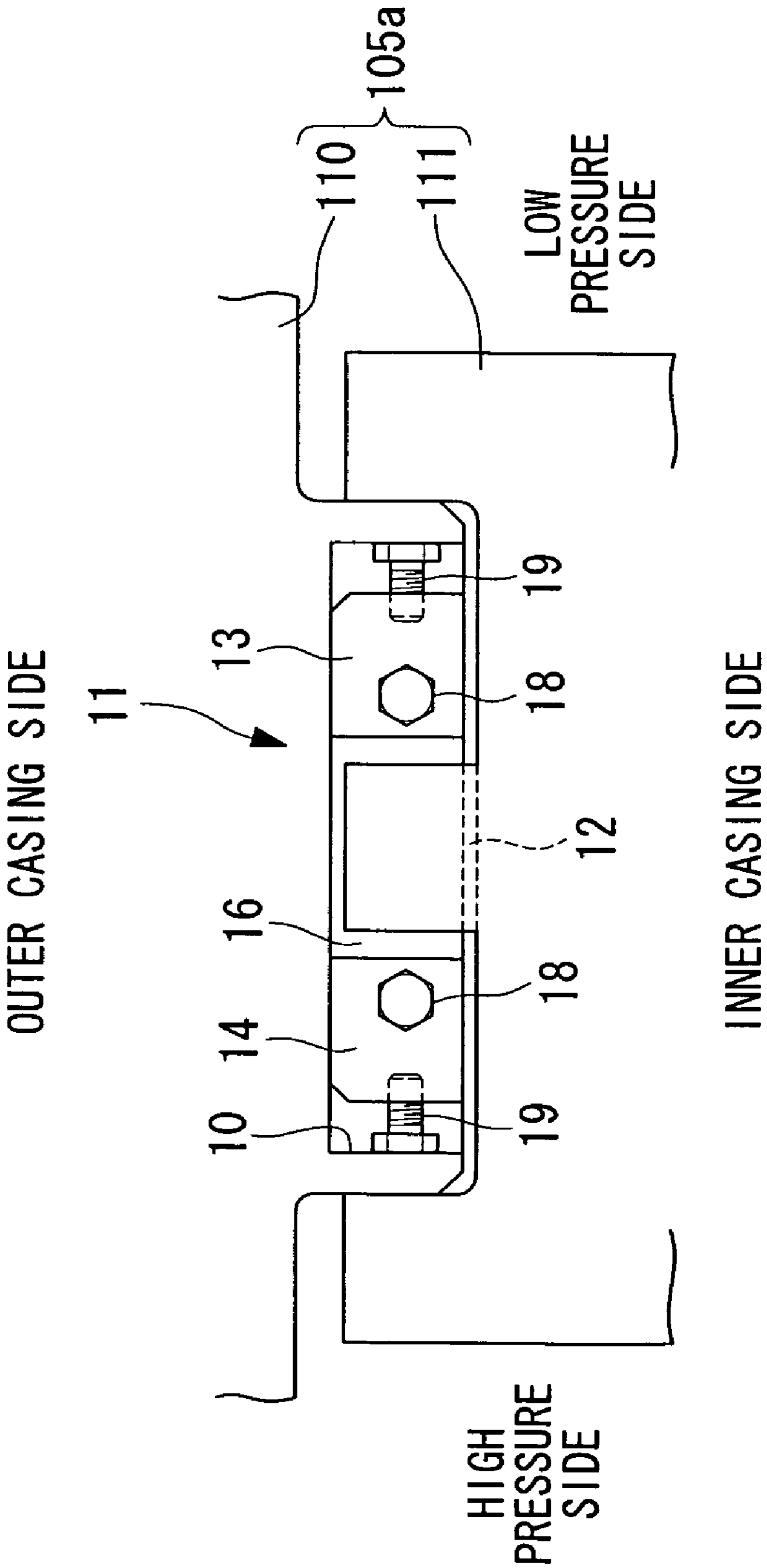
FIG. 4 is a cross-sectional view along the line IV-IV shown in FIG. 3.
Figure 5:
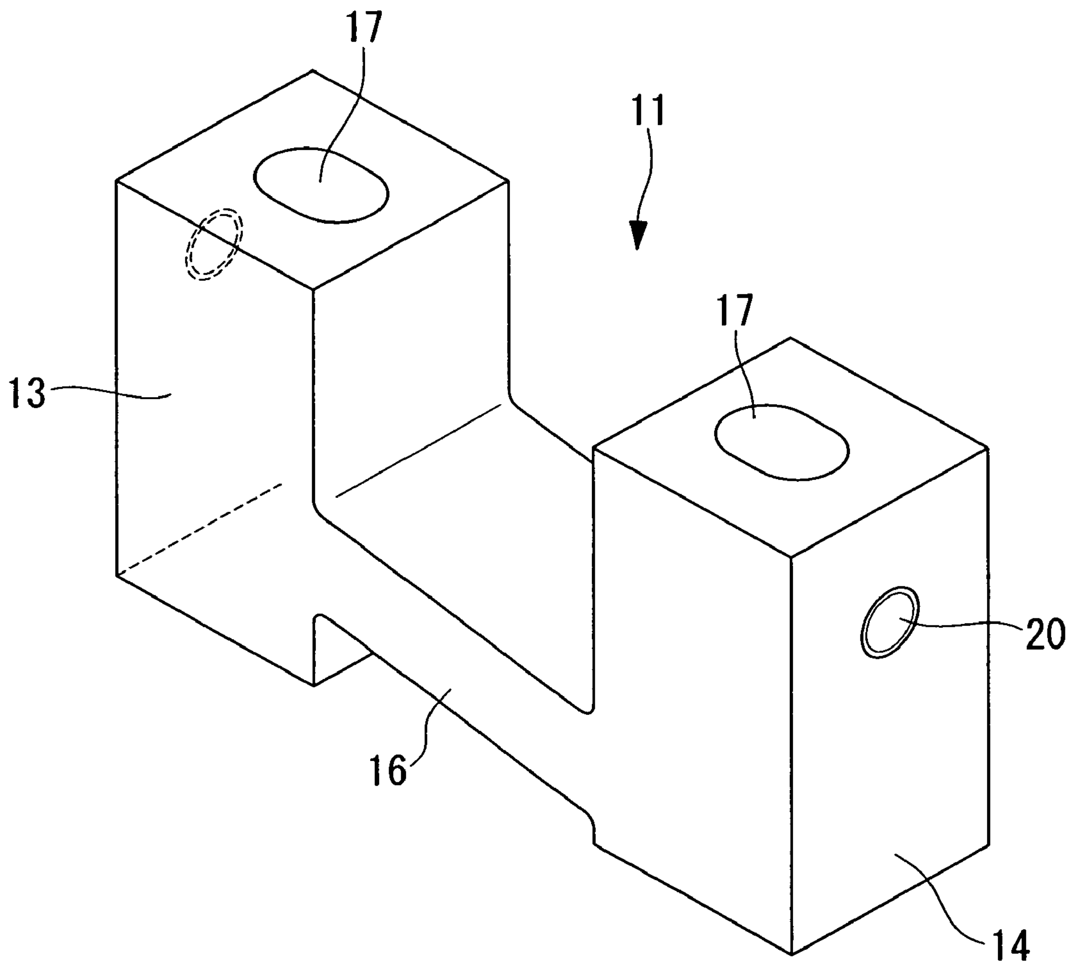
FIG. 5 is a perspective view of a key constituting a vertical-direction positioning unit.

FIG. 1 is a schematic structural view showing a concrete example in which a centering mechanism 1 according to this embodiment is applied to a turbine (hereinafter referred to as "gas turbine") 100. FIG. 2 is a cross-sectional view along the line II-II shown in FIG. 1. FIG. 3 is a cross-sectional view along the line III-III shown in FIG. 2. FIG. 4 is a cross-sectional view along the line IV-IV shown in FIG. 3. FIG. 5 is a perspective view of a key constituting a vertical-direction positioning unit.

As shown in FIG. 1, the gas turbine (rotary machine) 100 includes, as main components, a compressor 101 which compresses air taken in from outside, combustors 102 which are supplied with the air compressed by the compressor 101 and fuel and which generate combustion gas, and a turbine 103 which is rotated by the combustion gas generated in the combustors 102.

Further, the gas turbine 100 includes a rotor 104 having upright moving blades 101*a* and 103*a* on its outer circumference and a casing 105 having upright stationary blades 101*b* and 103*b* on its inner circumference.

The rotor 104 includes a compressor-side rotor 104*a* which has the moving blades 101*a* used in the compressor 101 and a turbine-side rotor 104*b* which has the moving blades 103*a* used in the turbine 103. The compressor-side rotor 104*a* and the turbine-side rotor 104*b* are coupled (connected) by an intermediate shaft 104*c*.

The casing 105 is constituted by an upper casing 105*a* and a lower casing 105*b*. The casing 105 covers the outer circumference of the rotor 104, thereby forming a compressor casing 106 in which the moving blades 101*a* and the stationary blades 101*b* are alternately arranged in the axial direction of the rotor 104, a combustor casing 107 in which the combustors 102 are arranged at regular intervals in the circumferential direction of the rotor 104, and a turbine casing 108 in which the moving blades 103*a* and the stationary blades 103*b* are alternately arranged in the axial direction of the rotor 104.

In the gas turbine 100 having the above-described structure, when the moving blades 101*a* are rotated in response to the rotation of the compressor-side rotor 104*a*, air taken into the compressor 101 is captured and compressed in spaces between the moving blades 101*a* and the stationary blades 101*b* at respective stages in the compressor casing 106 formed by the compressor-side rotor 104*a* and the casing 105. Then, when the air compressed in the compressor casing 106 of the compressor 101 flows into the combustor casing 107, the compressed air is supplied to the combustors 102. The combustors 102 are supplied with fuel, including fuel gas, and perform combustion using the compressed air supplied from the compressor 101, thereby generating combustion gas. High-temperature and high-pressure combustion gas generated by the combustors 102 is supplied to the turbine casing 108 formed by the turbine-side rotor 104*b* and the casing 105, so that the combustion gas flows into spaces between the moving blades 103*a* and the stationary blades 103*b* at respective stages to rotate the turbine-side rotor 104*b*. Note that since the rotation of the turbine-side rotor 104*b* is transferred to the compressor-side rotor 104*a* via the intermediate shaft 104*c*, the compressor-side rotor 104*a* also rotates together with the turbine-side rotor 104*b*.

As shown in FIGS. 1 and 2, the upper casing 105*a* covering the outer circumferences of the compressor-side rotor 104*a* and the turbine-side rotor 104*b* has an upper outer casing (outer member) 110 and an upper inner casing (inner member) 111. As shown in FIG. 2, the lower casing 105*b* covering the outer circumferences of the compressor-side rotor 104*a* and the turbine-side rotor 104*b* has a lower outer casing (outer member) 112 and a lower inner casing (inner member) 113.

For ease of explanation, FIG. 2 does not show components other than the upper casing 105*a*, the lower casing 105*b*, and the centering mechanism 1.

As shown in FIG. 2, the centering mechanism 1 according to this embodiment includes, as main components, a horizontal-direction positioning unit 2 which positions the upper inner casing 111 and the lower inner casing 113 in the horizontal direction (in the right-and-left direction in FIG. 2), and vertical-direction positioning units 3 which position the upper inner casing 111 and the lower inner casing 113 in the vertical direction (in the up-and-down direction in FIG. 2).

The horizontal-direction positioning unit 2 includes a first horizontal-direction positioning unit 4 provided at the top (upper part in FIG. 2) of the upper casing 105*a* and a second horizontal-direction positioning unit 5 provided at the bottom (lower part in FIG. 2) of the lower casing 105*b*.

The first horizontal-direction positioning unit 4 has a through-hole 6 which is drilled in a thickness direction of the upper outer casing 110 and has a circular shape in plan view, a concave part 7 which is formed on the outer circumferential surface of the upper inner casing 111 and has a long-gutter-like elongated hole shape in the rotor axial direction in plan view, and a pin 8 which is to be inserted into the through-hole 6 and the concave part 7. The through-hole 6 and the concave part 7 are formed to have gutter widths that are approximately the same as the outer diameter of the pin 8. The cross-sectional shape of the pin 8 may be a shape obtained when parts of circular cross section are cut with two parallel chords. In that case, the pin 8 is formed such that the outer walls at the parallel chords of the pin 8 are fitted inside the inner walls of the concave part 7.

Similarly to the first horizontal-direction positioning unit 4, the second horizontal-direction positioning unit 5 has a through-hole 6 which is drilled in a thickness direction of the lower outer casing 112 and has a circular shape in plan view, a concave part 7 which is formed on the outer circumferential surface of the lower inner casing 113 and has a long-gutter-like elongated hole shape in the rotor axial direction in plan view, and a pin 8 which is to be inserted into the through-hole 6 and the concave part 7.

Next, the vertical-direction positioning units 3 will be described with reference to FIGS. 3 to 5.

The vertical-direction positioning units 3 are provided at both sides of the casing 105 (see FIG. 1); specifically, they are provided near junctions of the upper casing 105*a* and the lower casing 105*b*. The vertical-direction positioning units 3 are provided on the inner circumferential surfaces located at upper-end side parts of the lower outer casing 112 and have a rectangular shape in plan view (see FIG. 3). Each of the vertical-direction positioning units 3 includes a key gutter 10 having a rectangular shape in cross-sectional view (see FIG. 4), a key 11 which is set (accommodated) in the key gutter 10 and reciprocates in the axial direction (of the rotor 104), and a gutter portion 12 which is provided on the outer circumferential surface located at an upper-end side part of the lower inner casing 113 and receives a part of the key 11 in a slidable manner.

The key gutter 10 is formed to have approximately the same height as the key 11 (or to have a height slightly (somewhat) higher than the key 11), and the upper end of the key gutter 10 is an open end. The open end is closed when the upper casing 105*a* is placed on the lower casing 105*b*. Further, the key gutter 10 is formed to have a width wider than the key 11, so that the key 11 can reciprocate in the axial direction in the key gutter 10. A female threaded part 10*a* is provided at the bottom face (face opposed to the open end) of the key gutter 10 into which is screwed a male screw part 18*a* provided at the tip of a key-securing bolt 18, to be described later.

As shown in FIGS. 3 and 5, the key 11 has a first member 13 which extends in a direction perpendicular to the axial direction and is located at an upstream side (high pressure side), a second member 14 which extends in a direction perpendicular to the axial direction and is located at a downstream side (low pressure side), and an oblique member 16 which extends in the axial direction and connects a low-pressure-side end face of the first member 13 and a high-pressure-side end face of the second member 14. Each of the first member 13 and the second member 14 is a substantially square pole having approximately the same height as the key gutter 10 (or having a height slightly (somewhat) shorter than the key gutter 10). The oblique member 16 is a plate-like member which inclines downward from the upstream side (high pressure side) to the downstream side (low pressure side).

The inclination angle of the oblique member 16 is set to an angle at which the upper inner casing 111 and the lower inner casing 113 naturally slide downward along the oblique member 16 by only the gravity acting on the upper inner casing 111 and the lower inner casing 113 (in short, an angle at which they move rightward in FIG. 3, in other words, an angle larger than a friction angle), in a state where the gas turbine 100 (see FIG. 1) is stopped (in other words, in a state where gas does not affect upstream-side (high-pressure-side) end faces (left end faces in FIG. 3) of the upper inner casing 111 and the lower inner casing 113 and downstream-side (low-pressure-side) end faces (right end faces in FIG. 3) of the upper inner casing 111 and the lower inner casing 113).

Note that this does not mean that the inclination angle is strictly set equal to or larger than the friction angle. Usually, in the inner casing and in the blade ring, the flow of working fluid imposes a load in the rotor axial direction, and, when the operation is started, the upper inner casing 111 and the lower inner casing 113 are quickly pushed downstream and seated at a given position (even if they are placed on a conventional horizontal key or even if they are positioned upstream in an unbalanced state due to play in a mounting gutter, for example, when the operation is started, they are seated at a given downstream position against the friction). It is preferable to set the inclination angle in a direction in which they slide downstream because it helps them to be seated. It is more preferable if the inclination angle is equal to or larger than the friction angle because they can be seated at the given position in a stable manner from the start of the operation.

A through hole 17 is drilled in the height direction approximately at the center part in the cross-sectional view of each of the first member 13 and the second member 14. The key-securing bolt 18 is inserted into the through hole 17 and the male screw part 18*a* of the key-securing bolt 18 is tightened into the female threaded part 10*a*, so that the key 11 is sandwiched between a bolt head 18*b* of the key-securing bolt 18 and the bottom face of the key gutter 10 and is secured to the lower outer casing 112.

The through hole 17 is drilled such that its width in the axial direction is larger than in a direction perpendicular to the axial direction and has an elongated hole shape extending in the axial direction in plan view. The through hole 17 is formed such that the key 11 can reciprocate in the axial direction when the key-securing bolt 18 is loosened.

Further, female threaded parts 20 which are screwed with male screw parts 19*a* provided at the tips of key position adjusting bolts 19 are provided at a high-pressure-side end face of the first member 13 and a low-pressure-side end face of the second member 14. With bolt heads 19*b* of the key position adjusting bolts 19 being brought into contact with the side faces of the key gutter 10, one of the key position adjusting bolts 19 is tightened and the other one of the key position adjusting bolts 19 is loosened, thereby allowing the key 11 to move in the axial direction.

The gutter portion 12 is a gutter for receiving the oblique member 16 of the key 11 and is formed to have the same inclination angle as the oblique member 16.

Next, a description will be given of a procedure for adjusting the position of the upper inner casing 111 and the lower inner casing 113 in the vertical direction, performed by using the vertical-direction positioning units 3, having the above-described structures.

First, the key-securing bolts 18 are loosened to produce gaps between lower end faces of the bolt heads 18*b* and upper end faces of the key 11.

Then, in order to position the lower inner casing 113 at a desired position in the vertical direction, one of the key position adjusting bolts 19 is loosened and the other one of the key position adjusting bolts 19 is tightened to move the key 11 in the axial direction. The lower inner casing 113 is thus moved in the direction perpendicular to the axial direction (i.e., in the vertical direction).

When the lower inner casing 113 is moved to the desired position, the key position adjusting bolts 19 are turned to be loosened such that the bolt heads 19*b* press the side faces of the key gutter 10. Therefore, the key 11 is fixed so as to be prevented from moving in the axial direction.

Lastly, the key-securing bolts 18 are turned to be tightened to completely (firmly) fix the key 11 to the lower outer casing 112.

According to the centering mechanism 1 of this embodiment, the key 11 is only moved in the key gutter 10 in the axial direction, so that the lower inner casing 113 is moved along the oblique member 16 provided for the key 11, in the direction perpendicular to the axial direction (i.e., in the vertical direction) in a non-stepwise manner.

Therefore, it is possible to easily and quickly position the upper inner casing 111 and the lower inner casing 113 in the vertical direction, to improve the efficiency of the centering work, and to reduce the work time.

Unlike the conventional technology, it is unnecessary to prepare a new key (liner) every time the centering work is performed. Therefore, the cost and the work time required for the centering work can be substantially reduced.

The inclination angle of the oblique member 16 is set such that low-pressure-side end faces 111*a* and 113*a* of the upper inner casing 111 and the lower inner casing 113 are brought into contact with (are pressed against) high-pressure-side end faces 110*a* and 112*a* of the upper outer casing 110 and the lower outer casing 112, in a state where the gas turbine 100 (see FIG. 1) is stopped or in a state where the gas pressure is low immediately after starting of operation. In other words, the inclination angle of the oblique member 16 is set to produce a state where the low-pressure-side end faces of the upper inner casing 111 and the lower inner casing 113 and the high-pressure-side end faces of the upper outer casing 110 and the lower outer casing 112 are always sealed.

Accordingly, the upper inner casing 111 and the lower inner casing 113 can be prevented from being moved in the axial direction (more specifically, toward the high pressure side in the axial direction), and the upper inner casing 111 and the lower inner casing 113 can be maintained at the desired position where the upper inner casing 111 and the lower inner casing 113 are always centered.

Note that the centering mechanism of the present invention has been described with reference, for example, to the gas turbine shown in FIG. 1. Application of the centering mechanism of the present invention is not limited to the gas turbine; it can be applied to centering of a blade ring or an inner casing in a rotary machine such as a compressor.

What is claimed is:

1. A centering mechanism that centers an inner member located inside in a radial direction, with respect to an outer member arranged to surround the inner member in a circumferential direction, the inner member comprising an upper inner member and a lower inner member, the outer member comprising an upper outer member and a lower outer member, the centering mechanism comprising:

a vertical-direction positioning unit which is provided on an inner circumferential surface located at the upper-end side part of the lower outer member, the vertical-direction positioning unit positions the inner member in a vertical direction in a non-stepwise manner by moving the vertical-direction positioning unit in the horizontal direction.

2. A centering mechanism according to claim 1, wherein, the vertical-direction positioning unit includes an oblique member on which the inner member is placed and which extends obliquely with respect to a horizontal direction, wherein the oblique member is moved in the horizontal direction to perform the positioning in the vertical direction.

3. A centering mechanism according to claim 2, wherein an angle formed by a horizontal plane and an upper face of the oblique member, on which the inner member is placed, is equal to or larger than a friction angle of the inner member.

4. A centering mechanism according to claim 3, wherein a low-pressure-side end face of the inner member and a high-pressure-side end face of the outer member are structured to be always in contact.

5. A rotary machine comprising the centering mechanism according to claim 1.

* * * * *